United States Patent [19]

Hoffer et al.

[11] Patent Number: 4,798,440

[45] Date of Patent: Jan. 17, 1989

[54] FIBER OPTIC CONNECTOR ASSEMBLY

[75] Inventors: John C. Hoffer; Ronald R. Schaffer, both of Harrisburg, Pa.

[73] Assignee: AMP Incorporated, Harrisburg, Pa.

[21] Appl. No.: 460,230

[22] Filed: Jan. 24, 1983

[51] Int. Cl.$^4$ ............................................. G02B 6/36
[52] U.S. Cl. .............................. 350/96.20; 350/96.21
[58] Field of Search ............... 350/96.20, 96.21, 96.22

[56] References Cited

U.S. PATENT DOCUMENTS

| | | | |
|---|---|---|---|
| 3,922,064 | 11/1975 | Clark et al. | 350/96.20 |
| 3,999,837 | 12/1976 | Bowen et al. | 350/96.22 |
| 4,167,303 | 9/1979 | Bowen et al. | 350/96.20 |
| 4,268,114 | 5/1981 | d'Auria et al. | 350/96.20 |
| 4,273,413 | 6/1981 | Bendiksen et al. | 350/96.20 |
| 4,327,964 | 5/1982 | Haesly et al. | 350/96.20 |
| 4,355,862 | 10/1982 | Kock | 350/96.20 |
| 4,380,349 | 4/1983 | Bray | 350/96.20 X |

Primary Examiner—William L. Sikes
Assistant Examiner—Akm E. Ullah
Attorney, Agent, or Firm—Adrian J. LaRue; Anton P. Ness

[57] ABSTRACT

A fiber optic connector assembly of the type for positioning fiber optic connectors relative to light-emitting and light-sensing members comprises a receptacle mountable onto a printed circuit board and in which the light-emitting and light-sensing members are disposed. A housing in which fiber optic connectors terminated onto fiber optic transmission members are mounted in a spring-biased condition and is latchably connected to the receptacle. The fiber optic connectors are disposed on the housing a connector-carrying member is latchably secured in the housing placing the fiber optic connectors under spring tension thereby forming a fiber optic plug which is disposed in the receptacle and latched thereto with the fiber optic connectors positioned adjacent the light-emitting and light-sensing members.

10 Claims, 2 Drawing Sheets

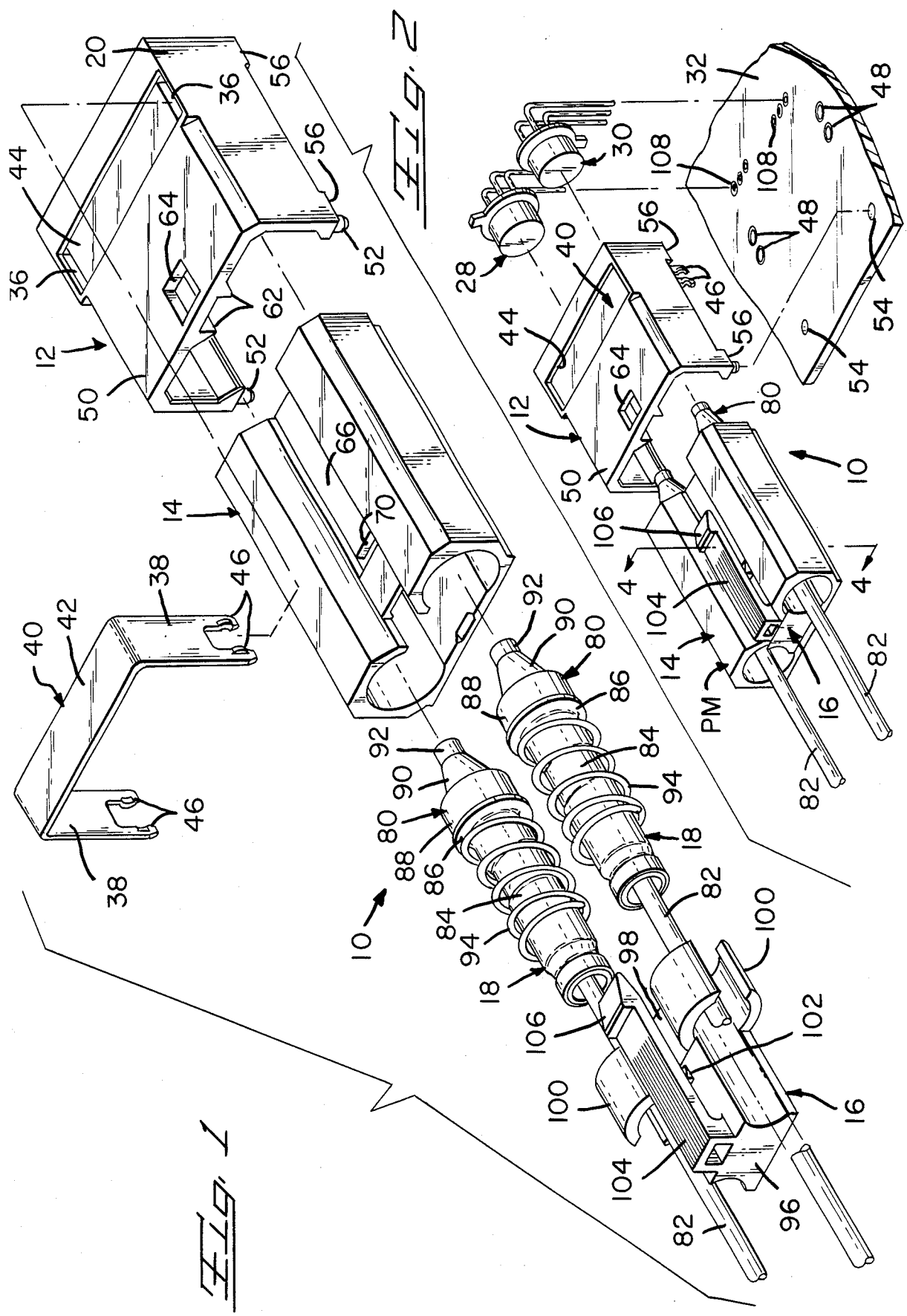

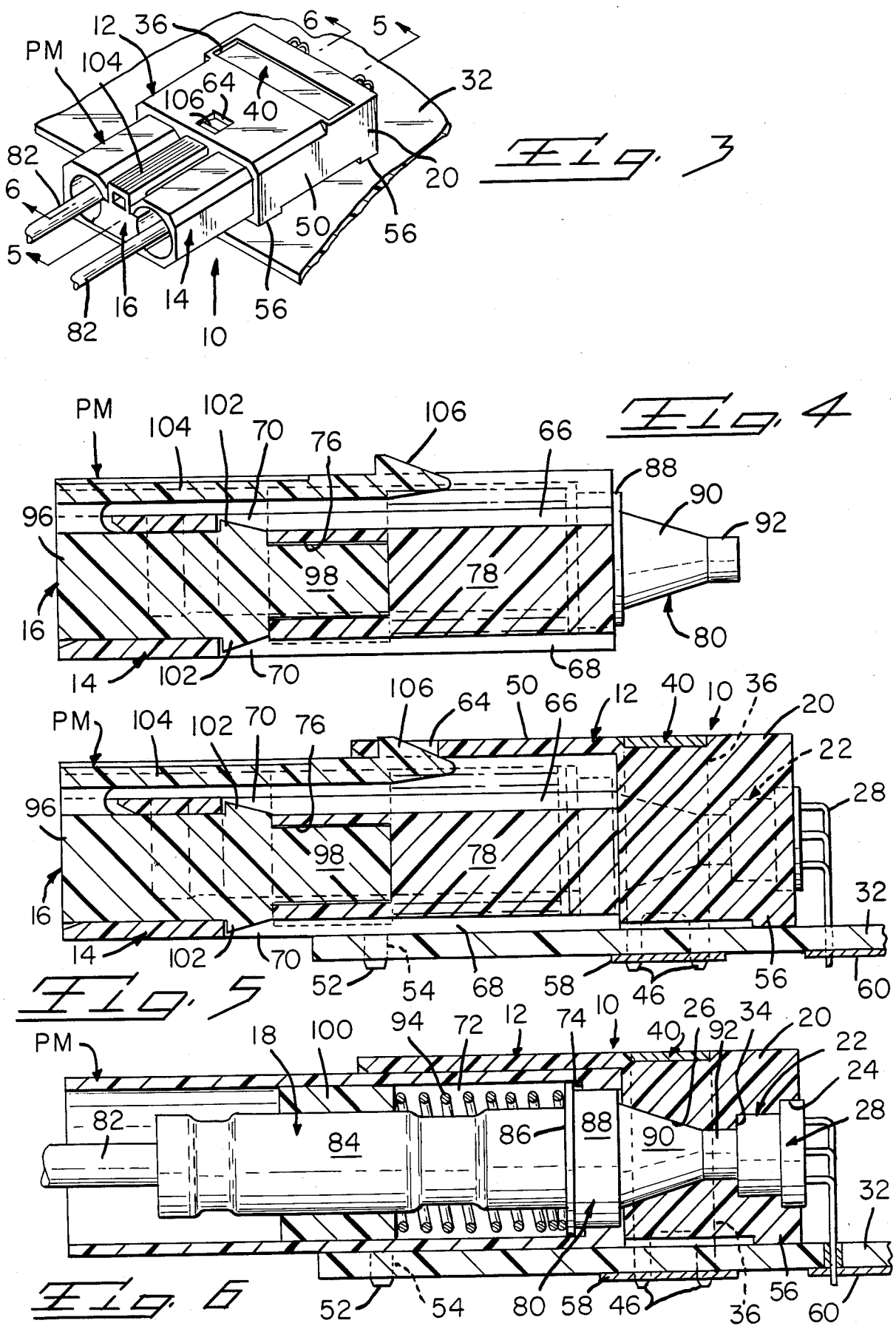

FIBER OPTIC CONNECTOR ASSEMBLY

FIELD OF THE INVENTION

This invention relates to fiber optic connectors and more particularly to fiber optic connector assemblies for use in conjunction with light-emitting and light-sensing members.

BACKGROUND OF THE INVENTION

. Fiber optic transmission members are increasingly being used in conjunction with light-emitting and light-sensing members as part of transmitter and receiver packages of electronic circuits for processing signal information. It is important that connector assemblies for connecting fiber optic transmission members to the light-emitting and light-sensing members have minimum light losses between the fiber optic transmission members and the light-emitting and light-sensing members. The alignment between fiber optic connectors terminated to the fiber optic transmission members and light-emitting and light-sensing members must be precise so that optimum operation is achieved. The ease of mating of matable parts of the connector assembly is important and such parts must have minimum play to make certain that precise alignment between the fiber optic connectors and the light-emitting and light-sensing members is accomplished. Size of the connector assembly is important due to the increasing density of components being mounted on printed circuit boards and the spacing between the boards. East of mounting of the receptacle in which the light-emitting and light-sensing members are disposed and in which the connector housing is latchably connected onto the printed circuit board is an important consideration. Fast termination of the fiber optic connectors to fiber optic transmission members is an important feature.

SUMMARY OF THE INVENTION

According to the present invention, a fiber optic connector assembly of the type for positioning fiber optic connectors relative to light-emitting and light-sensing members comprises a receptacle mountable onto a printed circuit board and in which the light-emitting and light-sensing members are disposed. A housing in which fiber optic connectors terminated onto fiber optic transmission members are mounted in a spring-biased condition is latchably connected to the receptacle. The fiber optic connectors are disposed in the housing and a member is latchably secured in the housing placing the fiber optic connectors under spring tension thereby forming a fiber optic plug which is disposed in the receptacle and latched thereto with the fiber optic connectors positioned adjacent the light-emitting and light-sensing members.

BRIEF DESCRIPTION OF THE DRAWINGS

FIG. 1 is a perspective and exploded view of parts of a fiber optic connector assembly.

FIG. 2 is a perspective and exploded view similar to FIG. 1 showing part of the connector assembly in an assembled condition.

FIG. 3 is a perspective view of the fiber optic connector assembly in an assembled and connected condition.

FIG. 4 is a longitudinal section view taken along line 4—4 of FIG. 2.

FIG. 5 is a longitudinal section view taken along line 5—5 of FIG. 3.

FIG. 6 is a longitudinal section view taken along line 6—6 of FIG. 3.

DETAILED DESCRIPTION OF THE INVENTION

As shown in the drawings, fiber optic connector assembly 10 comprises a receptacle 12, a housing 14, a member 16, and fiber optic connectors 18.

Receptacle 12 is molded from a suitable plastic material and includes a forward section 20 in which a pair of profiled bores 22 are disposed with only one being shown in FIGS. 5 and 6. Each profiled bore 22 includes a first section 24 and a second section 26. First sections 24 of profiled bores 22 receive respectively therein conventional light-emitting member 28 and light-sensing member 30, the electrical leads of which are electrically connected to conductive paths on printed circuit board 32. Thus light-emitting member 28 and light-sensing member 30 are positioned in the stepped sections of first section 24 of profiled bores 22 to position members 28 and 30 therein, the inner surface of first sections 24 of profiled bores 22 defining a stop surface 34 for members 28 and 30. Sections 26 of profiled bores 22 have inner cylindrical sections and outer frustoconical sections to accommodate complementary sections of fiber optic connectors 18 as hereafter described.

Openings 36 extend through forward section 20 of housing 12 at each side thereof along which respective legs 38 of a metal staple-shaped mounting member 40 extend while light 42 is disposed in a recess 44 of section 20. Compliant members 46 of legs 38 frictionally engage respective holes 48 in printed circuit board 32. A U-shaped hood section 50 extends rearwardly from forward section 20 of receptacle 12 and has projections 52 extending outwardly from the bottom surfaces of the sides of hood section 50 which frictionally engage respective holes 54 in printed circuit board 32. Receptacle 12 is thus positioned on printed circuit board 32 with light-emitting member 28 and light-sensing member 30 positioned in respective profiled bores 22; legs 56 position receptacle 12 from printed circuit board 32. Compliant members 46 can be soldered to part of ground plane 58 when the respective electrical leads of light-emitting member 28 and light-sensing member 30 are flow-soldered to respective conductive paths 60. With mounting member 40 soldered to ground plane 58, shielding is provided for members 28 and 30. The inside surface of hood section 50 is profiled to receive the complementary profiled outer surface of housing 14 therein and includes spaced projections 62 extending inwardly from the top inner surface along the sides of opening 64 that extends through the uper section of hood section 50.

Housing 14 is molded from a suitable plastic material like that of receptacle 12 and, as pointed out, its exterior surface mates with the inside surface of hood section 50 when it is disposed therein. Central recesses 66, 68 are located centrally of respective top and bottom surfaces of housing 14 and they communicate with opposed openings 70. Bores 72 extend through an internal section 78 of housing 14 with only one being shown in FIG. 6 and an annular flange 74 is located adjacent the forward ends of bores 72 so that the forward ends of bores 72 have a smaller diameter thereat. A channel 76 is located within internal section 78 of housing 14.

Fiber optic connectors 18 are preferably of the type completely disclosed in U.S. patent application Ser. No. 381,495 filed May 24, 1982 which is completely incorporated by reference herein. However, other types of fiber optic connectors to accomplish the intended result can of course be utilized. Fiber optic connectors 18 have ferrules 80 molded from plastic material having resilient characteristics into which stripped fiber optic transmission members of fiber optic cables 82 are positioned and crimping ferrules 84 with flanges 86 are controllably crimped onto ferrules 80 to crimpably secure the fiber optic transmission members in position in connectors 18 as disclosed in the above-identified patent application with the ends of the fiber optic transmission members being coincident with the front surfaces of ferrules 80. Flanges 86 are disposed against annular sections 88 of ferrules 80 which extend through the forward openings of bores 72 of housing 14 with frustoconical sections 90 and cylindrical sections 92 of ferrules 80 extending outwardly from the forward surface of housing 14 as illustrated in FIG. 4. A coil spring 94 is telescopically mounted on crimped ferrules 84. The diameter of flanges 86 is such that they move freely within bores 72 but abut against annular flange 74 to limit movement of connectors 18 along bores 72.

Connector-carrying member 16 is molded from the same plastic material as that of receptacle 12 and housing 14 and it comprises a body section 96 from which extends forward section 98 and C-shaped members 100. Latching projections 102 extend outwardly from the top and bottom surfaces of body section 96 and they include beveled top surfaces and planar rear surfaces thereby having a wedge shape. An integral flexible latching arm 104 extends outwardly from the top surface of body section 96 rearwardly of latching projection 102 and extends forwardly along body section 96 and forward section 98. A latching section 106 is located at the free end of latching arm 104 and has tapered leading surfaces with the top surface including a planar rear surface.

Fiber optic connector assembly 10 is assembled onto printed circuit board 32 in conjunction with light-emitting member 28 and light-sensing member 30 according to the following description. Light-emitting member 28 and light-sensing member 30 are positioned in respective sections of bores 22 of receptacle 12 and receptacle 12 is then positioned on printed circuit board 32 with compliant members 46 along with projections 52 frictionally positioned within respective holes 48 and 54 while electrical leads of members 28 and 30 are positioned in holes 108 whereafter board 32 can be subjected to a flow-soldering operation thereby soldering the electrical leads to respective conductive paths 60 while compliant members 46 are soldered to ground plane 58 thereby securing receptacle 12 in position on board 32.

Fiber optic connectors 18 are positioned in respective bores 72 in housing 14 with coil springs 94 on crimping ferrules 84. Member 16 is then positioned in housing 14 with forward section 98 disposed in channel 76 of internal section 78 and latching projections 102 are positioned in openings 70 thereby latchably securing member 16 in position in housing 14 with latching arm 104 extending along but spaced from central recess 66. C-shaped members 100 engage coil springs 94 as shown in FIG. 6 thereby urging flanges 86 against respective annular flanges 74 in bores 72 which places fiber optic connectors 18 under spring tension and forming a fiber optic plug member PM as shown in FIGS. 2 through 6.

The fiber optic plug member PM is now inserted within receptacle 12 with housing member 14 being positioned within hood section 50 thereof so that cylindrical sections 92 and frustoconical sections 90 of ferrules 80 are positioned in complementary portions of second sections 26 of profiled bores 22 as shown in FIG. 6 so that the front surfaces of ferrules 80 are positioned in engagement with respective light-emitting member 28 and light-sensing member 30. Latching section 106 of latching arm 104 is latched within opening 64 of receptacle 12 thereby latching the fiber optic plug member PM in position in receptacle 12. Coil springs 94 exert spring forces on ferrules 80 so that the front surfaces of cylindrical sections 92 are held in spring-biased engagement with members 28 and 30 and such spring forces also cause cylindrical sections 92, because of the dimensions of the cylindrical sections of sections 26 of profiled bores 22 coupled with the resilient characteristics of ferrules 80, to be reduced in diameter to centrally align the fiber optic transmission members with the axes of bores 22.

To remove the fiber optic plug member from receptacle 12, latching arm 104 is depressed into central recess 66 and this enables the fiber optic plug member to be readily disconnected from receptacle 12 as well as to be connected therewith.

We claim:

1. A fiber optic connector assembly of the type for positioning fiber optic connectors relative to light-emitting and light-sensing members comprises a receptacle mountable onto a printed circuit board and in which the light-emitting and light-sensing members are disposed, and a housing in which fiber optic connectors terminated onto fiber optic transmission members are mounted along with springs in a spring-biased condition and which housing is latchably connected to the receptacle, characterized in that:
    said fiber optic connectors are mounted in a connector-carrying member which is latchably secured in said housing placing the fiber optic connectors under spring tension thereby forming a fiber optic plug which is disposed in the receptacle; and
    a latches member on the fiber optic plug latching the fiber optic plug to the receptacle with the fiber optic connectors positioned adjacent the light-emitting and light-sensing members.

2. A fiber optic connector assembly as set forth in claim 1, characterized in that a staple-shaped mounting member engages said receptacle in the area of the light-emitting and light-sensing members for mounting the receptacle onto the printed circuit board and providing shielding for the light-emitting and light-sensing members.

3. A fiber optic connector assembly as set forth in claim 1, characterized in that said housing has an internal section through which bores extend in which the fiber optic connectors are disposed.

4. A fiber optic connector assembly as set forth in claim 3, characterized in that said internal section has a channel in which a section of said connector-carrying member is disposed, C-shaped members of said section engage said springs along the fiber optic connectors urging flanges on the fiber optic connectors against annular flanges in said bores, and latch projections on said section latch into openings in said housing latching said housing and connector-carrying member together.

5. A fiber optic connector assembly as set forth in claim 4, characterized in that said latching member is an integral part of said connector-carrying member and includes a latching section for latchable engagement with an opening in said receptacle.

6. A fiber optic connector assembly as set forth in claim 1, characterized in that said receptacle has a forward section and a hood section, said forward section having profiled bores, said profiled bores having a first section in which the light-emitting and light-sensing members are disposed and a second section in which forward ends of the fiber optic members are disposed with front surfaces thereof positioned in engagement with the light-emitting and light-sensing members.

7. A fiber optic connector assembly for mounting onto a printed circuit board for connecting fiber optic transmission members to light-emitting and light-sensing members electrically connected to the printed circuit board, comprising:
receptacle means having profiled bore means;
mounting means for mounting said receptacle means onto the printed circuit board with the light-emitting and light-sensing members disposed in first sections of said profiled bore means;
housing means having bore member means;
fiber optic connector means for termination onto the fiber optic transmission members and positionable into the bore member means along with spring means;
means positionable in said housing means for receiving part of the fiber optic connector means and for engagement with said spring means for urging flange means of said fiber optic connector means against stop means in said bore member means with forward profiled sections of said fiber optic connector means extending outwardly from a front surface of said housing means;
latching means latching said positionable means to said housing means thereby defining fiber optic plug means and placing said fiber optic connector means under spring tension; and
latch arm means of said fiber optic plug means for latching said fiber optic plug means within said receptacle means with said profiled forward sections of said fiber optic connector means disposed in second sections of said profiled bore means.

8. A fiber optic connector assembly as set forth in claim 7, wherein said receptacle means includes forward section means in which said profiled bore means are located and a hood section.

9. A fiber optic connector assembly as set forth in claim 8, wherein said housing means includes an internal section having a channel therein, said positionable means having a section disposed in said channel and C-shaped members engage said spring means.

10. A fiber optic connector assembly as set forth in claim 9, wherein said latch arm means comprises an integral latch member as part of said positionable means which includes a latching section latchable in an opening of said hood section.

* * * * *